Patented Apr. 27, 1943

2,317,380

UNITED STATES PATENT OFFICE 2,317,380

PLASTICIZER

Edward Higgins, Brooklyn, N. Y., assignor of fifty per cent to Maximillian C. Meyer, Brooklyn, N. Y.

No Drawing. Application January 21, 1939, Serial No. 252,122

8 Claims. (Cl. 260—735)

My invention relates to a method of plasticizing chlorinated rubber by means of the esters of tri-carballylic acid and the product produced thereby, and more specifically my invention relates to a method of making a flowable and moldable chlorinated rubber plastic without the use of volatile solvents by the addition thereto of the esters of tri-carballylic acid or their derivatives, and the plasticized product thereof.

Chlorinated rubber, because of its inherent properties, is an extremely valuable material. It is acid and alkali resistant and has effective water resistant properties. When properly plasticized it may be molded into many objects, such as films, or rods or tubes, or any desired form. By reason of its good dielectric properties, it is useful as insulation or protective material in electrical systems. Another of its important uses is for protective coatings such as varnishes or paints.

There has, however, been a great deal of difficulty in plasticizing chlorinated rubber because of the lack of plasticizers having a low volatility and high stability and which also have an active solvent action of the chlorinated rubber.

Many attempts to find such an active plasticizing medium have been made. It has been proposed to use dibutylphthalate as a plasticizer for chlorinated rubber. Dibutyl phthalate, although a good softening agent, has a weak solvent action on chlorinated rubber and must be used in combination with volatile solvents. The dibutyl phthalate also lowers the acid and alkali resistance of the final product and because of its nature further weakens the moisture resistance property of the chlorinated rubber.

Chlorinated diphenyl is also a good softener, but is not an active plasticizer and hence must be used in combination with volatile active solvents to effect a homogeneous dispersion of the chlorinated rubber.

Linseed oil (and other fatty oils) has been proposed but it also acts only as a softener and is not an active plasticizer. It is, therefore, necessary to employ it in combination with volatile solvents.

Heat treated tung oil is a good softener but must be used with active volatile solvents. Also esterified abietic acid has been employed, but similarly has the major shortcoming that it must be used in combination with active volatile solvents.

Thus it can be seen that the plasticizers that are known and used in this field are plasticizers in the sense that they are softeners only and hence necessitate the added use of one or more active volatile solvents in order to obtain the proper colloiding of the chlorinated rubber. The very real disadvantages of using such solvents are manifold and are sketchily referred to above in connection with the well known problems of: solvent removal, dimensional shrinkage, seasoning, solvent recovery, and bubble formation.

A further important practical difficulty arises in connection with preparing original plastic masses of chlorinated rubber of a desirable consistency especially in connection with effecting a pigment dispersion therein.

I have found that the alkyl esters of tri-carballylic acid, their derivatives and substitution products act not only as plasticizers but also as active non-volatile solvents for chlorinated rubber, and I thus provide for the first time that chlorinated rubber may be plasticized and dissolved by a single agent, namely the above referred to alkyl esters of tri-carballylic acid, their derivatives and substitution products.

Tri-carballylic acid has the following molecular structure:

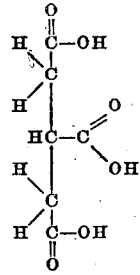

and may be prepared as given in "Treatise on General and Industrial Chemistry," Part 1, Organic, page 376 by Ettore Molinari:

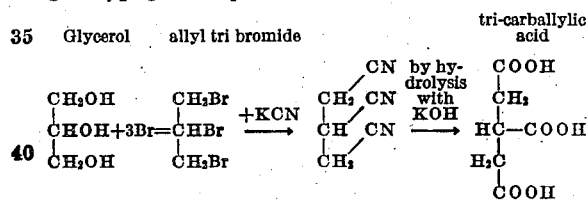

Esterification can be made with any of the alcohols, either monobasic or polybasic.

The acid may, for example, be esterified with normal butyl alcohol:

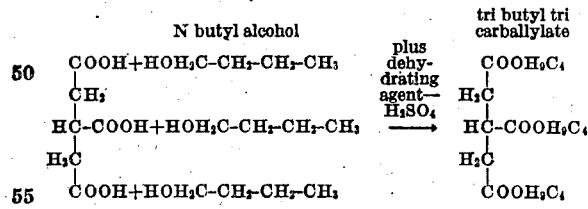

The esters of tri-carballylic acid are extremely compatible with chlorinated rubber and when used in the proper proportions as will be set forth more specifically herein below convert chlorinated rubber to a good thermo-plastic molding compound, such as will soften under heat and mechanical pressure for proper flow and molding effects.

Preferably I employ from 10 parts by weight to 50 parts by weight of the esters of tri-carballylic acid with 100 parts by weight of the chlorinated rubber, but for certain purposes more or less tri-carballylic acid may be employed. I may employ equal parts of the ester and the chlorinated rubber depending upon the degree of flexibility desired. When proportions of the esters of tri-carballylic acid within the preferred range above set forth are employed, the chlorinated rubber is easily molded while hot and will set hard upon chilling. When additional solvents are employed in the mix, as little as 5 parts of the ester to 100 of chlorinated rubber may be used.

Inasmuch as no volatile solvent need be employed, a special property of this plastic mix is the absence of shrinkage so that when, for example, a film is extruded, there is no appreciable dimensional change on the hardening of the mass. As can be appreciated, this is an extremely important property because of the present day necessity for extreme dimensional accuracy in molding operations.

A further new and unexpected result lies in the fact that the combination of the ester or esters of tri-carballylic with the chlorinated rubber produces a true colloid so that there is no subsequent granulation or precipitation within the plastic.

The esters of tri-carballylic acid are active solvents for chlorinated rubber either in the hot or cold condition. Certain of the presently used softeners are active solvents when hot but when cold or at normal temperatures they are not, and separate out from the rubber chloride when it cools to room temperature. They are therefore impractical, and can be used only with active volatile solvents.

The use of esters of tri-carballylic acid as solvent plasticizers for chlorinated rubber is especially advantageous when it is desired to incorporate pigments within the chlorinated rubber plastic. In the dispersion of pigment material in a plastic mass, it is extremely desirable to have the plastic mass of such a firm consistency that it will exert a shearing action on the pigment when worked in a suitable mixer such as a Banbury mixer so that the particles of pigment will be effectively separated and dispersed throughout the mass.

When the volatile solvents of the prior art were employed, the mass was in too fluid a condition to effect the proper shearing action on the pigments and hence a good dispersion could not be obtained. By the use of the esters of tri-carballylic acid, however, the mass can be sufficiently plasticized without the use of a volatile liquid solvent so that it reaches that desirable consistency in which the shearing action of the mass effectively separates the pigment agglomerates and disperses particles of the pigment homogeneously throughout. This is especially applicable to ordinarily difficultly dispersable pigments such as carbon, black, Prussian blue, madder lake, etc.

My invention further resides in the formation of a molding powder comprising chlorinated rubber and one or more of the esters of tri-carballylic acid.

Although I specifically used the term esters of tri-carballylic acid with reference to the solvent plasticizer that I employ, I, of course, wish it to be understood that my invention relates to the basic properties of this material and that mono-, di-, or tri- substitution products of tri-carballylic acid or mixtures may be employed thereof. Thus the term esters of tri-carballylic acid as used herein is intended fully to cover such substitution products and derivatives thereof.

A further use for the ester of tri-carballylic acid is for plasticizing the natural resin shellac. The esters of tri-carballylic acid have been found especially suitable for plasticizing shellac. This is an important function since it is difficult to properly plasticize shellac and retain its desired properties.

It is an object of my invention to provide a new plasticizer comprising the esters of tri-carballylic acid.

It is another object of my invention to provide a single material that acts as solvent and plasticizer for chlorinated rubber.

It is still another object of my invention to provide a solvent plasticizer for chlorinated rubber that eliminates the necessity for the additional use of active volatile solvents in making true thermoplastic chlorinated rubber compounds with or without pigments.

It is a further object of my invention to plasticize chlorinated rubber with the esters of tri-carballylic acid, their substitution products and aliphatic and aromatic derivatives thereof.

It is still a further object of my invention to convert chlorinated rubber into the form of a molding powder.

It is still a further object of my invention to provide a molding powder comprising chlorinated rubber and esters of tri-carballylic acid with or without pigment.

It is a further object of my invention to provide a novel true colloidal mass of chlorinated rubber and solvent plasticizer.

It is a further object of my invention to provide a novel method of pigmenting chlorinated rubber by the use of a solvent plasticizer.

It is a further object of my invention to provide a novel method of homogeneously dispersing particles of pigment throughout chlorinated rubber by incorporating into the chlorinated rubber esters of tri-carballylic acid.

As a specific example of a composition that I may employ to illustrate my invention, I combine chlorinated rubber with tri butyl tri carballylate in the following proportions:

| | Parts |
|---|---|
| Chlorinated rubber | 100 |
| Tri butyl tri carballylate | 10-50 |

The proportions of tributyl tri carballylate may be varied depending upon the degree of flexibility required. The resultant plasticized chlorinated rubber is easily molded under heat and sets hard upon chilling. The tributyl tri carballylate converts the normally non-thermoplastic chlorinated rubber to a moldable thermo plastic with good flow properties and the final molded product has a desirable flexibility.

The molded material may also be extruded to form films, rods, tubes and the like and for such extrusion the use of the active plasticizer of this invention such as the esters of tricarballylic acid is especially valuable since there is no substantial volume of volatile solvent to be evaporated which would cause shrinkage. It is to be understood that although it is not essential that a volatile solvent be employed, since the ester of tri-carballylic acid is an active solvent plasticizer for the chlorinated rubber, a volatile solvent may be employed to facilitate the manufacturing process.

Other representative examples of the esters of tri-carballylic acid that I may employ are the methyl, ethyl, propyl, amyl, or any of the higher alkyl esters of tri-carballylic acid. Substitution products such as the esters formed from the combination of dibasic alcohols or polybasic alcohols generally, such as glycerol, with tri-carballylic acid may be employed.

To form the molding powders that I have mentioned from my plasticizing mix, I take, for example, a hundred parts of the material, such as chlorinated rubber, together with from 10 to 50 parts of one of the esters of tri-carballylic acid, above referred to, and a suitable amount of coloring matter, such as titanium dioxide (for white color) if such is desired, and thoroughly mix and blend these ingredients together to form a completely homogeneous and uniform plastic mass. The mixing may be accomplished with or without a small amount of volatile solvent and is preferably carried out in a heavy duty mixer, such as a Banbury mixer.

After thorough colloiding the pigment may be further and finely dispersed by passing the colloided mass and working it between heavy calender rolls. Thereafter, the mix is granulated to powder form by any of the well known process of granulation.

I have set forth a number of examples of the active plasticizing action of the esters of tri-carballylic acid. These have been made by way of example only and I do not intend to be limited except by the appended claims.

I claim:

1. The method of plasticizing chlorinated rubber which comprises incorporating an ester of tri-carballylic acid therein.

2. The method of plasticizing chlorinated rubber which comprises incorporating an alkyl ester of tri-carballylic acid therein.

3. A plasticized compound which comprises chlorinated rubber and an ester of tri-carballylic acid.

4. A plasticized compound which comprises chlorinated rubber and an alkyl ester of tri-carballylic acid.

5. A plasticized compound which comprises chlorinated rubber and tri-butyl tri-carballylate.

6. A plasticized compound which comprises 10 to 50 parts by weight of an ester of tri-carballylic acid and 100 parts by weight of chlorinated rubber.

7. A molding powder comprising chlorinated rubber an an ester of tri-carballylic acid.

8. A plasticized compound which comprises chlorinated rubber and tri-ethyl tri-carballylate.

EDWARD HIGGINS.